United States Patent
Lim et al.

(10) Patent No.: US 9,251,582 B2
(45) Date of Patent: Feb. 2, 2016

(54) METHODS AND SYSTEMS FOR ENHANCED AUTOMATED VISUAL INSPECTION OF A PHYSICAL ASSET

(71) Applicant: General Electric Company, Schenectady, NY (US)

(72) Inventors: Ser Nam Lim, Niskayuna, NY (US); Vinod Padmanabhan Kumar, Bangalore Karnataka (IN); Russell Robert Irving, Ballston Lake, NY (US); John Brandon Laflen, Niskayuna, NY (US); Li Guan, Clifton Park, NY (US); Shubao Liu, Niskayuna, NY (US); Xingwei Yang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 443 days.

(21) Appl. No.: 13/731,209

(22) Filed: Dec. 31, 2012

(65) Prior Publication Data

US 2014/0185912 A1    Jul. 3, 2014

(51) Int. Cl.
*G06K 9/00* (2006.01)
*G06T 7/00* (2006.01)
*G06F 17/30* (2006.01)

(52) U.S. Cl.
CPC .......... *G06T 7/001* (2013.01); *G06F 17/30247* (2013.01); *G06T 7/0028* (2013.01); *G06T 2207/30164* (2013.01); *G06T 2207/30244* (2013.01)

(58) Field of Classification Search
None
See application file for complete search history.

(56) References Cited

U.S. PATENT DOCUMENTS

| | | |
|---|---|---|
| 5,699,444 A | 12/1997 | Palm |
| 5,850,469 A | 12/1998 | Martin et al. |
| 6,751,343 B1 | 6/2004 | Ferrell et al. |
| 6,825,856 B1 * | 11/2004 | Fazzio et al. .................. 345/646 |
| 6,985,620 B2 | 1/2006 | Sawhney et al. |
| 6,992,315 B2 | 1/2006 | Twerdochlib |
| 7,520,176 B1 | 4/2009 | Ko et al. |
| 7,715,994 B1 | 5/2010 | Richards et al. |
| 7,720,322 B2 | 5/2010 | Prisco |
| 8,125,529 B2 | 2/2012 | Skoskiewicz et al. |

(Continued)

OTHER PUBLICATIONS

Lim et al., "Automatic Registration of Smooth Object Image to 3D CAD Model for Industrial Inspection Applications", IEEE, 2013 International Conference on 3D Vision, 2013.*

(Continued)

*Primary Examiner* — Aaron W Carter
(74) *Attorney, Agent, or Firm* — Pabrita K. Chakrabarti

(57) ABSTRACT

A computer-implemented system for enhanced automated visual inspection of a physical asset includes a visual inspection device capable of generating images of the physical asset and a computing device including a processor and a memory device coupled to the processor. The computing device includes a storage device coupled to the memory device and coupled to the processor. The storage device includes at least one historic image of the physical asset and at least one engineering model substantially representing the physical asset. The computing device is configured to receive, from a present image source, at least one present image of the physical asset captured by the visual inspection device. The computing device is configured to identify at least one matching historic image corresponding to the at least one present image. The computing device is configured to identify at least one matching engineering model corresponding to the at least one present image.

14 Claims, 4 Drawing Sheets

(56) References Cited

U.S. PATENT DOCUMENTS

| | | | |
|---|---|---|---|
| 8,171,809 B2 | 5/2012 | Fritz | |
| 8,184,152 B2 | 5/2012 | Pryor et al. | |
| 2005/0131657 A1* | 6/2005 | Sean Mei | G06T 17/00 |
| | | | 703/1 |
| 2005/0131659 A1* | 6/2005 | Mei | G06T 17/10 |
| | | | 703/1 |
| 2007/0258807 A1 | 11/2007 | Brummel | |
| 2008/0247635 A1* | 10/2008 | Davis et al. | 382/152 |
| 2008/0247636 A1* | 10/2008 | Davis et al. | 382/152 |
| 2009/0116728 A1* | 5/2009 | Agrawal | B22D 11/1265 |
| | | | 382/154 |
| 2009/0154293 A1 | 6/2009 | Sengupta et al. | |
| 2010/0140936 A1 | 6/2010 | Benito et al. | |
| 2010/0235111 A1* | 9/2010 | Sharp | G06Q 10/04 |
| | | | 702/35 |
| 2010/0235112 A1* | 9/2010 | Kesler | G06Q 99/00 |
| | | | 702/35 |
| 2010/0275574 A1 | 11/2010 | Salunkhe | |
| 2010/0303337 A1* | 12/2010 | Wallack et al. | 382/154 |
| 2011/0041474 A1 | 2/2011 | Gerez et al. | |
| 2011/0251975 A1* | 10/2011 | Evans | G06F 17/50 |
| | | | 705/348 |
| 2012/0141010 A1 | 6/2012 | Wu et al. | |
| 2012/0159321 A1* | 6/2012 | Rolleston et al. | 715/274 |
| 2012/0224049 A1 | 9/2012 | Cox | |
| 2014/0185912 A1* | 7/2014 | Lim | G06F 17/30247 |
| | | | 382/141 |
| 2014/0188767 A1* | 7/2014 | Iyer | G06Q 10/087 |
| | | | 706/12 |
| 2014/0188772 A1* | 7/2014 | Garvey | G05B 23/024 |
| | | | 706/46 |
| 2014/0278211 A1* | 9/2014 | Song | G01N 21/954 |
| | | | 702/150 |
| 2015/0019013 A1* | 1/2015 | Rose | G01L 1/16 |
| | | | 700/258 |
| 2015/0100138 A1* | 4/2015 | Laflen | G05B 13/04 |
| | | | 700/31 |

OTHER PUBLICATIONS

Newman et al., "A Survey of Automated Visual Inspection", Computer Vision and Image Understanding, Academic Press, US, vol. 61, No. 2, pp. 231-262 Mar. 1, 1995.

A PCT Search Report and Written Opinion issued in connection with corresponding Application No. PCT/US2013/075020 on Sep. 17, 2014.

* cited by examiner

METHODS AND SYSTEMS FOR ENHANCED AUTOMATED VISUAL INSPECTION OF A PHYSICAL ASSET

BACKGROUND

The field of the invention relates generally to computer-implemented programs and, more particularly, to a computer-implemented system for enhanced automated visual inspection of a physical asset.

Known methods of visual inspection of physical assets include the use of optical devices inserted within such physical assets without human entrance. Such known methods provide benefits by allowing for rapid visual analysis of complex physical assets that may be inaccessible to human technicians without disassembly or other servicing. In some such known cases, disassembly or servicing of complex physical assets may take hours to perform. During such disassembly or servicing, many such complex physical assets must be rendered temporarily inoperable. Therefore, known methods of visual inspection rapidly expedite analysis of internal conditions of complex physical assets and reduce downtime that may be caused by disassembly or servicing.

Known methods and systems of visual inspection of physical assets involve sending visual data to human technicians capable of diagnosing conditions of the complex physical assets. Human technicians may review such visual data using monitors, computers, or other displays. In many known methods and systems of visual inspection, human technicians will overlay collected visual data onto a three-dimensional engineering model and manually match features between the collected visual data and the three-dimensional model. Such overlaying, comparison, and matching may be very time consuming. Known methods and systems of visual inspection may also face the complexity that when visual data is received by the human technician, it is often too late to obtain new physical measurements that have not been previously collected by field engineers. In such cases, new physical measurements may only be collected on the next inspection of the physical asset.

Such known methods and systems of visual inspection of physical assets using optical devices do not facilitate efficient and effective identification of the component corresponding to visual data sent from the optical device to the human technician. In many known complex physical assets there are numerous components and sub-components. Review of the architectural details of each component and sub-component is often a necessary and time-consuming aspect of using known methods of visual inspection. Such review is necessary, however, in order to ensure that the human technician understands the exact component or sub-component associated with visual data. Misidentification may be logistically and financially expensive.

BRIEF DESCRIPTION

In one aspect, a computer-implemented system for enhanced automated visual inspection of a physical asset is provided. The system includes a visual inspection device capable of generating images of the physical asset. The system also includes a computing device. The computing device includes a processor. The computing device also includes a memory device coupled to the processor. The computing device also includes a storage device coupled to the memory device and additionally coupled to the processor. The storage device includes at least one historic image of the physical asset and at least one engineering model substantially representing the physical asset. The computing device is configured to receive, from a present image source, at least one present image of the physical asset captured by the visual inspection device. Also, the computing device is configured to identify at least one matching historic image corresponding to the at least one present image. Further, the computing device is configured to identify at least one matching engineering model corresponding to the at least one present image.

In a further aspect, a computer-based method for enhanced automated visual inspection of a physical asset is provided. The computer-based method is performed by a computing device. The computing device includes a processor. The computing device also includes a memory device coupled to the processor. The computing device further includes a storage device coupled to the memory device and additionally coupled to the processor. The storage device includes at least one historic image of the physical asset and at least one engineering model substantially representing the physical asset. The computer-based method includes receiving, from a present image source, at least one present image of the physical asset captured by the visual inspection device. The computer-based method also includes identifying at least one matching historic image corresponding to the at least one present image. The computer-based method further includes identifying at least one matching engineering model corresponding to the at least one present image.

In another aspect, a computer for enhanced automated visual inspection of a physical asset is provided. The computer includes a processor. The computer also includes a memory device coupled to the processor. The computer further includes a storage device coupled to the memory device and also coupled to the processor. The storage device includes at least one historic image of the physical asset and at least one engineering model substantially representing the physical asset. The computer is configured to receive, from a present image source, at least one present image of the physical asset captured by the visual inspection device. The computer is also configured to identify at least one matching historic image corresponding to the at least one present image. The computer is further configured to identify at least one matching engineering model corresponding to the at least one present image.

DRAWINGS

These and other features, aspects, and advantages will become better understood when the following detailed description is read with reference to the accompanying drawings in which like characters represent like parts throughout the drawings, wherein.

Figure 1:
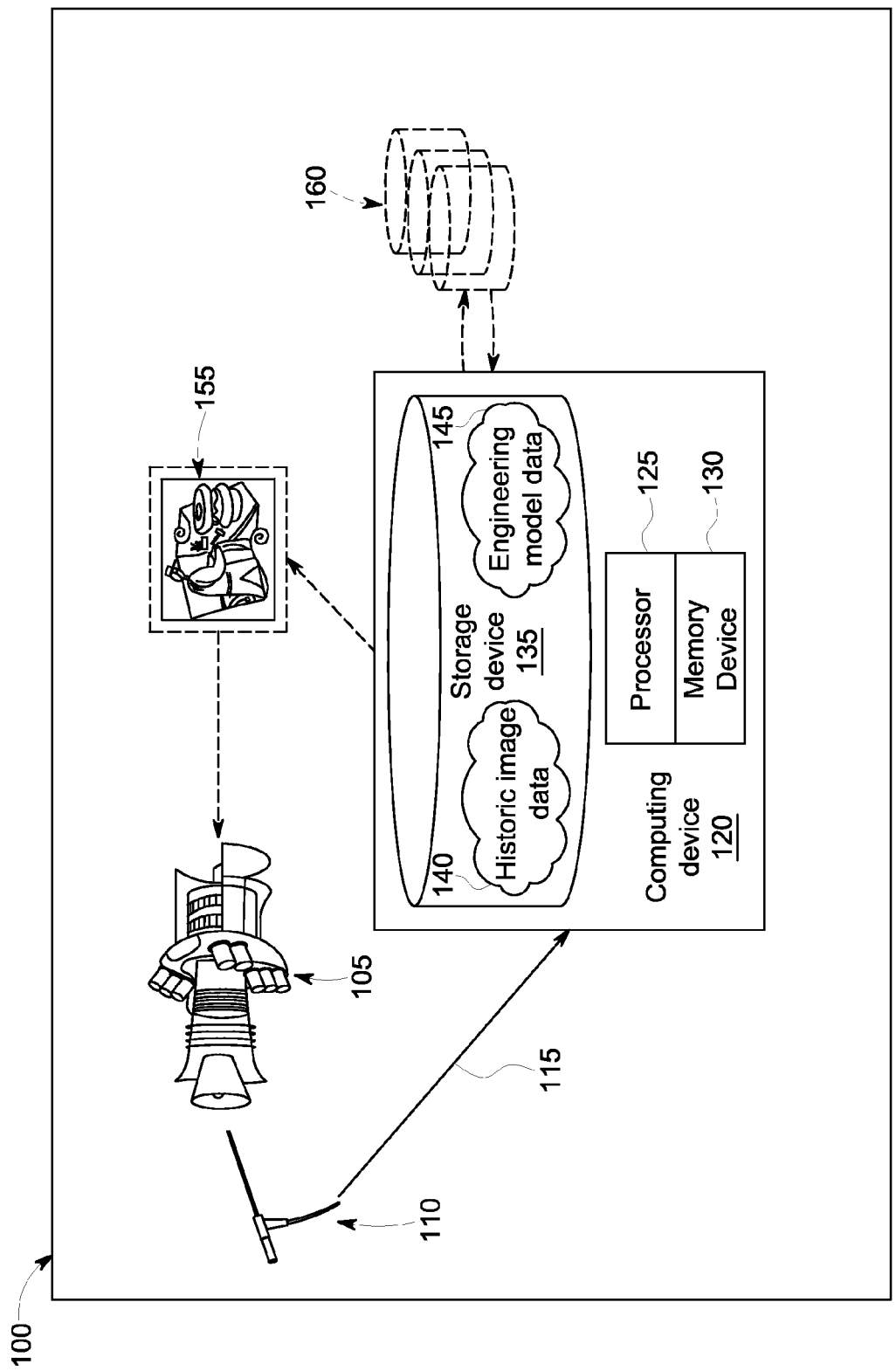
FIG. 1 is a schematic view of an exemplary high-level computer-implemented system for enhanced automated visual inspection of a physical asset.
Figure 3:
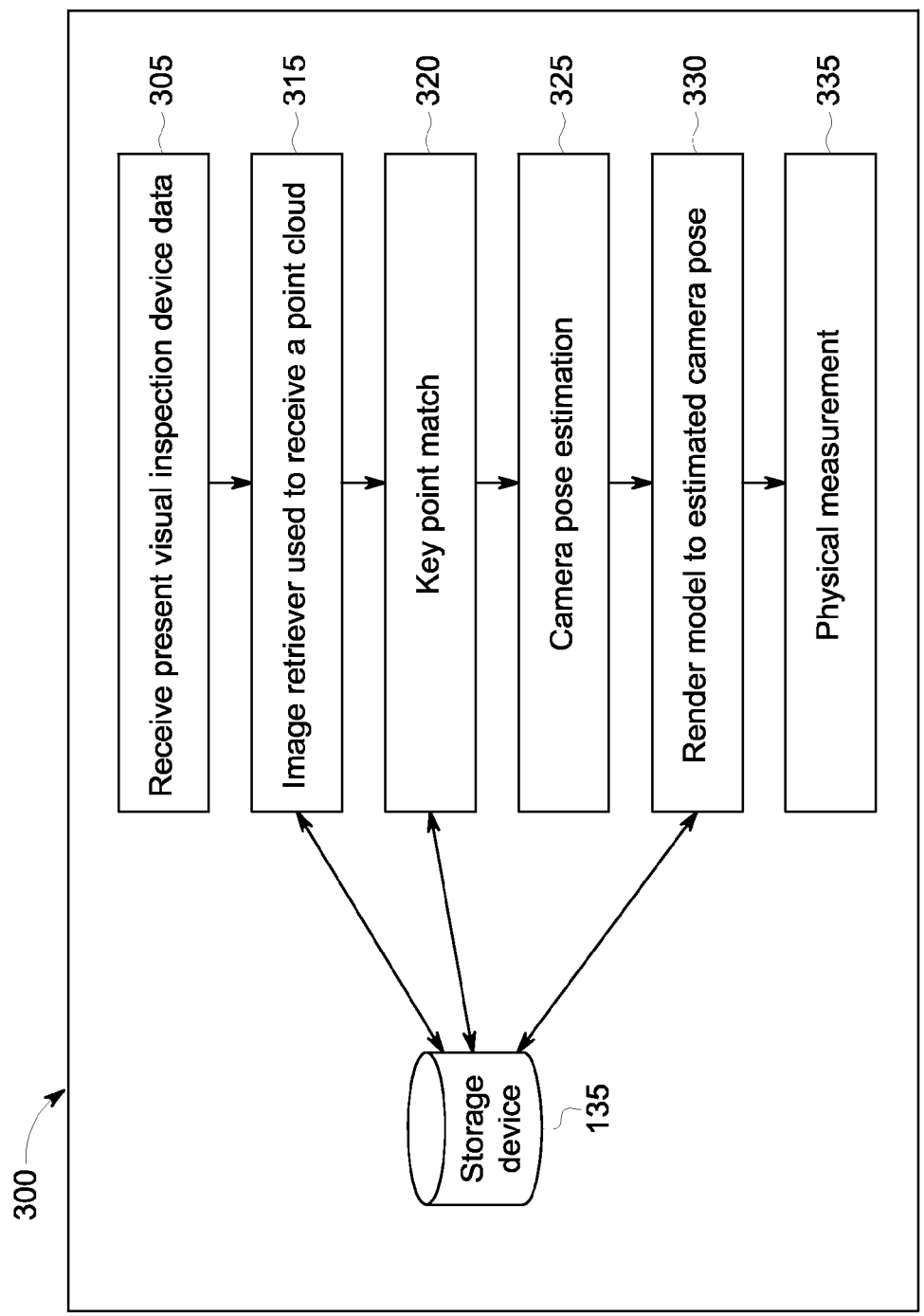
Figure 4:
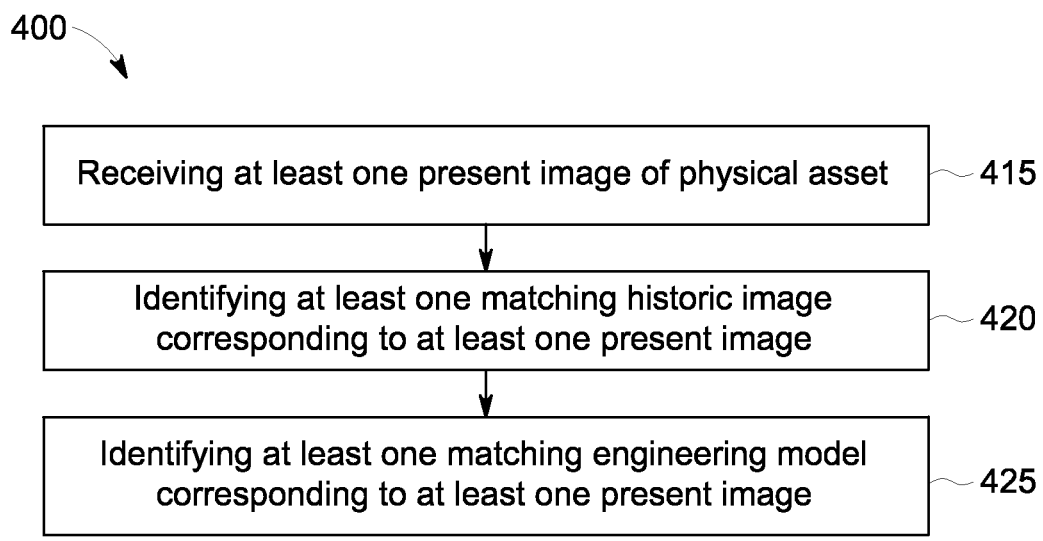

FIG. 3 is flow chart of an exemplary process for enhanced automated visual inspection of a physical asset using the computer-implemented system shown in FIG. 1; and FIG. 4 is a simplified flow chart of the overall method for enhanced automated visual inspection of a physical asset using the computer-implemented system shown in FIG. 1 to facilitate the enhanced visual inspection process shown in FIG. 3.

Unless otherwise indicated, the drawings provided herein are meant to illustrate key inventive features of the invention.

These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "automated" and related terms, e.g., "automatic," refers to the ability to accomplish a task without any additional input. Also, as used herein, the visual inspection of a physical asset is automated from the point that a reference image (e.g., the present image) is provided to the system to the point that it the reference image is overlaid over a three-dimensional model.

As used herein, the term "visual inspection device" and related terms, e.g., "visual inspection devices," refers to any optical device capable of being inserted into a physical asset, moving within a physical asset, capturing visual data regarding the physical asset, and transmitting the visual data to other systems. Such visual inspection devices may include, without limitation, borescopes, fiberscopes, video borescopes, rigid borescopes, or any digital camera capable of being inserted and maneuvered within a physical asset. Also, as used herein, visual inspection devices facilitate enhanced inspection of a physical asset by providing present images from the physical asset.

As used herein, the term "physical asset" and related terms, e.g., "assets," refers to any physical object that may be inspected using a visual inspection device. Such assets may include, without limitation, gas turbines, steam turbines, aircraft engines, diesel engines, automotive engines, truck engines, pressure vessels, and any simple or complex machinery that may be penetrated by a visual inspection device. Also, as used herein, physical assets are used to receive enhanced visual inspection.

As used herein, the term "engineering model" and related terms, e.g., "engineering model data," refers to any three-dimensional graphical model that substantially represents a physical asset. Such engineering models may include, without limitation, computer-aided drawings (CAD), computer-aided industrial design, photo realistic renderings, and any other model that substantially represents a physical asset and can be used to depict a typical physical asset in three dimensions. Also, as used herein, engineering models are used to describe the expected normal, three-dimensional design of the physical asset.

As used herein, the term "key point feature detection" and related terms refers to an approach to detect and describe local features in images. Key point feature detection typically includes methods of identifying interesting points on an object, extracting these points as features, and describing the features. Such methods include, without limitation, Scale Invariant Feature Transform (SIFT), Speeded Up Robust Features (SURF), Maximally Stable Extremal Regions (MSER), and Affine-SIFT (ASIFT). As algorithms evolve, some methods may change, be added, or be removed. Also, as used herein, key point feature detection allows for the comparison of present images with historic image data.

As used herein, the term "key point matching" and related terms refers to a process conducted after key point feature detection where a first feature from a first image can be found to refer to the same physical location on the physical asset as a second feature on a second image. Key point matching, therefore, allows for the correlation of features determined in key point feature identification between two different images. Also, as used herein, key point matching facilitates comparison of present images with historic image data.

As used herein, the term "point cloud" and related terms, e.g., "2D-3D point cloud" refers to a mapping of feature matches between a three-dimensional model and a two-dimensional historic image. Also, as used herein, the point cloud is created in an offline process and used to provide a three-dimensional engineering model along with the two-dimensional historic image after image retrieval identifies the historic image corresponding to the present image.

As used herein, the term "image retriever" and related terms, e.g., "image retrieval system," refers to a method of finding a second image that is most relevant to (i.e., most closely corresponds to) a first image. Many methods of image retrieval exist and accordingly the image retriever may apply any such method. The image retriever may include, without limitation, methods using K-Nearest Neighbor (K-NN), methods implementing a vocabulary tree and cluster-based retrieval, or any other method capable of organizing historic images and efficiently identifying historic images that correspond to a present image. Also, as used herein, the image retriever is used to identify a historic image and point cloud corresponding to a present image.

As used herein, the term "epipolar constraint" and related terms, e.g., "epipolar line," refer to a concept in computer vision and geometry that allows for the reconciling of two two-dimensional images taken of the same three-dimensional object from different positions. An epipolar line refers to the line that is perceived as a point in a first image and line in the second image. The divergent perception is caused by the different reference positions of the first and second image. As used herein, epipolar lines are used to constrain matching points between two images. The epipolar constraint is the use of the epipolar line to require that for each point observed in one image the same point must be observed in the other image on a known epipolar line. Where an epipolar constraint is not satisfied (i.e., the first image presents a point where the proposed corresponding point in the second image does not lie on the corresponding epipolar line) a match is noted as an error and penalized or discredited with respect to the other matches.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

FIG. 1 is a schematic view of an exemplary high-level computer-implemented system 100 for enhanced visual inspection of a physical asset 105. In the exemplary embodiment, physical asset 105 is a steam turbine. In alternative embodiments, physical asset 105 may be any physical object including, without limitation, gas turbines, aircraft engines, diesel engines, automotive engines, truck engines, pressure vessels, piping systems, generators, reduction gears, transformers, and any simple or complex machinery. Also, computer-implemented system 100 includes a visual inspection device 110. In the exemplary embodiment, visual inspection device 110 is a borescope. In alternative embodiments, visual inspection device 110 may include, without limitation, fiberscopes, video borescopes, rigid borescopes, or any digital camera device capable of being inserted and maneuvered within physical asset 105.

Computer-implemented system 100 also includes a computing device 120. Computing device 120 includes a processor 125 and a memory device 130. Processor 125 and memory device 130 are coupled to one another. In the exemplary embodiment, computing device 120 includes one processor 125 and one memory device 130. In alternative embodiments, computing device 120 may include a plurality of processors 125 and/or a plurality of memory devices 130.

Computing device 120 also includes a storage device 135. Storage device 135 is coupled to processor 125 and also coupled to memory device 130. In the exemplary embodiment, storage device 135 is a hard disk drive. In alternative embodiments, storage device 135 may be any storage device including, without limitation, optical storage devices, magnetic storage devices, network storage devices, flash storage devices, mass storage devices, and any other storage device capable of storing data for computer-implemented system 100. In at least some embodiments, computing device 120 is associated with external storage 160. In such embodiments, external storage 160 stores data that may be written to storage device 135 or used directly by computing device 120.

In the exemplary embodiment, storage device 135 includes historic image data 140 and engineering model data 145. Historic image data 140 represents data captured from prior use of visual inspection device 110 to inspect physical asset 105. In the exemplary embodiment, at least some historic image data 140 is created immediately after manufacturing physical asset 105. In alternative embodiments, historic image data 140 may be created at any time prior to the current inspection. In other embodiments, historic image data 140 may include image data from multiple inspections of physical asset 105. Engineering model data 145 represents data of pre-manufacturing designs of physical asset 105. In the exemplary embodiment, engineering model data 145 includes computer-aided drawings (CAD). In alternative embodiments, engineering model data 145 may include, without limitation, computer-aided industrial design, photo realistic renderings, and any other model that substantially represents a physical asset and can be used to depict typical physical asset 105.

In operation, visual inspection device 110 is inserted into physical asset 105 and transmits at least one present image 115 to computing device 120. Computing device 120 receives at least one present image 115 from visual inspection device 110. In alternative embodiments, computing device 120 may receive at least one present image 115 generated by visual inspection device 110 but stored at memory device 130, storage device 135, or external storage 160. In these embodiments, present image data 115 may be received by alternative sources for reasons of expediency. For example, the technician using visual inspection device 110 may have conducted a thorough inspection of physical asset 105 and captured all relevant image data 115 but is no longer available to stream live present image data 115. In such examples, accessing the same present image data 115 from data storage may be valuable.

Also, computing device 120 identifies at least one matching historic image (not shown in FIG. 1) from historic image data 140 corresponding to at least one present image 115. Further, computing device 120 identifies at least one matching engineering model (not shown in FIG. 1) from engineering model data 145 corresponding to at least one present image 115. In the exemplary embodiment, historic image data 140 corresponding to present image 115 is retrieved by an image retrieval process along with engineering model data 145 through the use of a point cloud which matches features between two-dimensional historic image data 140 and three-dimensional engineering model data 145. Point clouds and the relationship between two-dimensional historic image data 140 and three-dimensional engineering model data 145 are generated in a separate process from what is described in this disclosure. In the exemplary embodiment, the image retrieval process involves the use of a spatial entropy feature which captures the inter-region and intra-region characteristics based upon entropy. The spatial entropy feature represents the specific pose of visual inspection device 110 and scale similarities. The spatial entropy features are used to build an entropy feature vector which uses information regarding a given pixel and its neighbors (i.e., the pixels immediately adjacent to the pixel). The spatial nature of the image is represented by dividing the image into spatial cells and assigning a value for entropy to each cell and concatenating the entropy values of all cells into a feature vector.

In some embodiments, computing device 120 may measure and compare features from present image 115 and engineering model data 145 to determine variances between physical asset 105 and engineering model data 145. Variances may include, for example, a crack on the surface of physical asset 105, a warping of a component of physical asset 105, or any other condition that may cause a variance between present image 115 and engineering model data 145. Computing device 120 transmits any variances to a servicer 155 capable of providing diagnostic, replacement, and/or maintenance services to physical asset 105. In such embodiments, servicer 155 is capable of receiving information from computing device 120 regarding physical asset 105.

Figure 2:
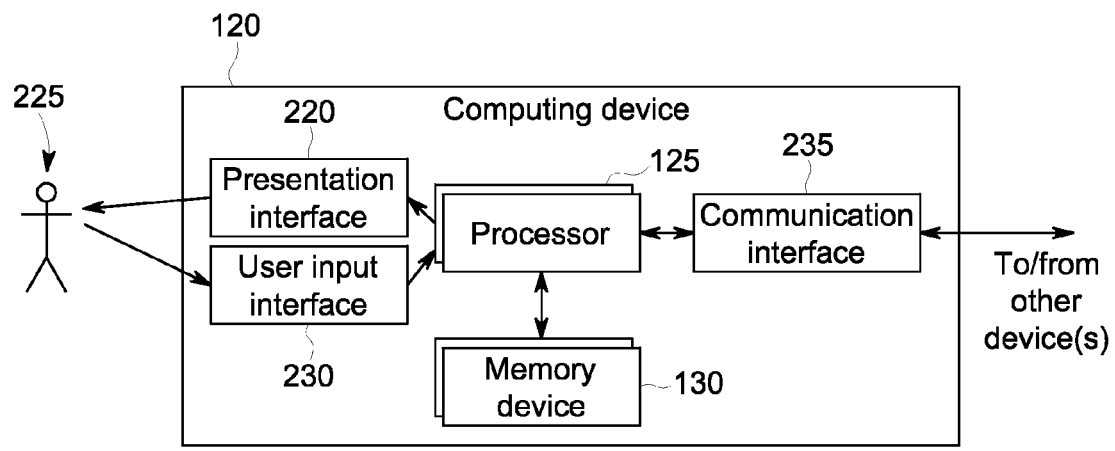
FIG. 2 is a block diagram of an exemplary computing device that may be used with the computer-implemented system shown in FIG. 1.

FIG. 2 is a block diagram of exemplary computing device 120 that may be used with computer-implemented system 100 (shown in FIG. 1). Computing device 120 includes a memory device 130 and a processor 125 operatively coupled to memory device 130 for executing instructions. In the exemplary embodiment, computing device 120 includes a single processor 125 and a single memory device 130. In alternative embodiments, computing device 120 may include a plurality of processors 125 and/or a plurality of memory devices 130. In some embodiments, executable instructions are stored in memory device 130. Computing device 120 is configurable to perform one or more operations described herein by programming processor 125. For example, processor 125 may be programmed by encoding an operation as one or more executable instructions and providing the executable instructions in memory device 130.

In the exemplary embodiment, memory device 130 is one or more devices that enable storage and retrieval of information such as executable instructions and/or other data. Memory device 130 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Memory device 130 may be configured to store operational data including, without limitation, at least one present image 115 (shown in FIG. 1), and/or any other type of data. In some embodiments, processor 125 removes or "purges" data from memory device 130 based on the age of the data. For example, processor 125 may overwrite previously recorded and stored data associated with a subsequent time and/or event. In addition, or alternatively, processor 125 may remove data that exceeds a predetermined time interval. Also, memory device 130 includes, without limitation, sufficient data, algorithms, and commands to facilitate operation of computer-implemented system 100.

In some embodiments, computing device 120 includes a user input interface 230. In the exemplary embodiment, user input interface 230 is coupled to processor 125 and receives input from user 225. User input interface 230 may include, without limitation, a keyboard, a pointing device, a mouse, a stylus, a touch sensitive panel, including, e.g., without limitation, a touch pad or a touch screen, and/or an audio input interface, including, e.g., without limitation, a microphone. A single component, such as a touch screen, may function as both a display device of presentation interface 220 and user input interface 230.

A communication interface 235 is coupled to processor 125 and is configured to be coupled in communication with one or more other devices, such as a sensor or another computing device 120, and to perform input and output operations with respect to such devices. For example, communication interface 235 may include, without limitation, a wired network adapter, a wireless network adapter, a mobile telecommunications adapter, a serial communication adapter, and/or a parallel communication adapter. Communication interface 235 may receive data from and/or transmit data to one or more remote devices. For example, a communication interface 235 of one computing device 120 may transmit an alarm to communication interface 235 of another computing device 120. Communications interface 235 facilitates machine-to-machine communications, i.e., acts as a machine-to-machine interface.

Presentation interface 220 and/or communication interface 235 are both capable of providing information suitable for use with the methods described herein, e.g., to user 225 or another device. Accordingly, presentation interface 220 and communication interface 235 may be referred to as output devices. Similarly, user input interface 230 and communication interface 235 are capable of receiving information suitable for use with the methods described herein and may be referred to as input devices. In the exemplary embodiment, presentation interface 220 is used to visualize and display the automatic overlay of present images 115 on engineering model data 145. Once visualized user 225 may use user input interface 230 to execute tasks including, without limitation, measurements and determinations of variances in present images 115 with respect to engineering model data 145. The task of measurement may include the use of software which provides measuring applications to make such measurements and determinations of variances.

In the exemplary embodiment, user 225 may use computing device 120 by receiving information on at least one present image 115, at least one matching historic image (not shown), and at least one matching engineering model (not shown) via presentation interface 220. User 225 may act on the information presented and use computing device 120 to update the condition of physical asset 105, request services (not shown) from servicer 155, or continue inspection of physical asset 105. User 225 may initiate such an action via user input interface 230 which processes the user command at processor 125 and uses communication interface 235 to communicate with other devices.

In the exemplary embodiment, computing device 120 is an exemplary embodiment of computing device 120. In at least some other embodiments, computing device 120 is also an exemplary embodiment of other devices (not shown) used for enhanced visual inspection of physical asset 105. In most embodiments, computing device 120 at least illustrates the primary design of such other devices.

FIG. 3 is flow chart of an exemplary process 300 for enhancing visual inspection of physical asset 105 using computer-implemented system 100 (both shown in FIG. 1). Process 300 includes receiving 305 present visual inspection device data. Receiving 305 present visual inspection device data represents the receipt at computing device 120 (shown in FIG. 1) of present images 115 (shown in FIG. 1) from visual inspection device 110 (shown in FIG. 1) capturing images from physical asset 105.

Process 300 additionally uses the image retriever to retrieve a point cloud 315. In the exemplary embodiment, the image retriever uses a K-Nearest Neighbor search to search through a kd-tree structure containing historic image data 140. In alternative embodiments, the image retriever uses different methods to search for a corresponding historic image 140. The point cloud represents a mapping of three-dimensional engineering model data 145 to two-dimensional historic image data 140. Therefore, when the image retriever identifies corresponding historic image 140, the point cloud containing both historic images 140 and engineering model data 145 is retrieved.

Process 300 also includes key-point matching 320 to compare present images 115 to matching historic images 140. Key-point matching 320 incorporates the extraction of specific features associated with images and uses the features to compare multiple images. In the exemplary embodiment, features (not shown) of present images 115 are compared to features (not shown) of historic images 140 that have been retrieved, resulting in pairs of matching features referring to the same physical location on physical asset 105. The features of present images 115 and historic images 140 may be the same features used in receiving 315 a point cloud using the image retriever, or different features. In the exemplary embodiment, key-point matching 320 includes three steps.

First, key-point matching 320 compares images in terms of local appearance and local geometric patterns. Local appearance comparison represents a comparison of a variety of image features. Local geometric pattern comparison represents a comparison of images as broken down to component geometric features. This comparison further includes annotating historic images 140 with shape boundary information and locating the same boundary in present images 115. This comparison also includes the transformation of each feature location in historic images 140 and present images 115. Transformation of the feature location can be accomplished, for example, by producing a scale invariant feature transformation (SIFT) for a feature on each image. The estimation method also includes comparing transformed features. In the exemplary embodiment, comparing transformed features includes the application of values to compensate for appearance and location of each feature, thereby adding location information to the transformed features.

Second, key-point matching 320 incorporates the use of an estimation method to find the best set of matched points between the images. Once transformed features have been compared, matches between features are obtained. The estimation method further includes applying two steps using random sample consensus (RANSAC) to eliminate outliers in the matches through multiple iterations. In the first step applying RANSAC, matches are constrained so that matching points must satisfy the epipolar constraint. To clarify, the epipolar constraint requires that for each point observed in one image the corresponding point must be observed in the other image on a known epipolar line. Therefore, an epipolar line is determined for both present image 115 and historic image 140 and used to create the epipolar constraint which is then used to constrain matches. In at least some embodiments, the epipolar constraint is determined by creating a fundamental matrix representative of the epipolar line. Given the large number of matches, the RANSAC approach involves using a subset of initial matches that are randomly chosen from the complete set of matches. The merit of this subset of initial matches is determined by an error value computed as the level of disagreement with the epipolar constraint. Depending upon the number of matches in the complete set, the process is iterated until an adequate number of subsets are evaluated with respect to the epipolar constraint. The epipolar geometry associated with the subset that has the lowest error rate is then used to eliminate matches that deviate from this geometry past a defined threshold.

In the second step applying RANSAC, matches are constrained to satisfy a projection matrix. The projection matrix is computed using the retrieved point cloud. The projection matrix represents a mathematical matrix that relates the two-dimensional to three-dimensional point cloud that has been transferred to present image 115. As in the first step, a subset of initial matches are randomly chosen from the set of matches (now constrained by the application of epipolar constraint). The projection matrix computed from this subset is assigned a merit value that depends upon the agreement of the matches in this subset with the computed projection matrix. The process is iterated depending upon the size of the total set of matches and the hypothesized projection matrix with the lowest error rate at the end is used.

Third, key-point matching 320 allows for associating engineering model data 145 retrieved together with historic image data 140 corresponding to present image data 115 by use of the retrieved point cloud corresponding to historic image data 140. In this step, the association or registration between two-dimensional historic image data 140 and three-dimensional engineering model data 145 is transferred to present image data 115. Therefore, each point on present image data 115, of which the match has been found, is now associated with three-dimensional points on engineering model data 145.

Process 300 further includes camera pose estimation 325. Camera pose estimation 325 is representative of determining the specific position and orientation of visual inspection device 110 with respect to physical asset 105. Camera pose estimation 325 includes determining projections of potential camera locations based upon engineering model data 145 associated with historic image data 140 and present images 115. In other words, engineering model data 145 is now associated or registered with present images 115 based upon the application of the point cloud (described above) and camera poses can be determined for present images 115 by creating and applying a projection matrix to the mapping of two-dimensional present image 115 to three-dimensional engineering model data 145. In the exemplary embodiment, determining projections includes solving a system of linear equations representative of a projection matrix of potential camera poses.

Process 300 additionally includes rendering model to estimated camera pose 330. Rendering model to estimated camera pose 330 represents using camera pose estimation 325 on associated engineering model data 145 to create a rendered model representative of the engineering model from the same camera position as visual inspection device 110.

Furthermore, process 300 includes physical measurement 335. Physical measurement 335 represents comparison of physical features of the rendered engineering model to present image 115. In the exemplary embodiment, physical measurement 335 includes comparing image data from a projection of engineering model data 145 for a turbine blade to present image 115 for a matching real turbine blade with a variance such as a crack and measuring the crack.

FIG. 4 is a simplified flow chart of overall method 400 for enhanced visual inspection of physical asset 105 using computer-implemented system 100 (both shown in FIG. 1) to facilitate enhanced visual inspection process 300 shown in FIG. 3. Computer device 120 (shown in FIG. 1) receives 415 at least one present image of physical asset 105. Receiving 415 at least one present image of physical asset 105 represents receiving present visual inspection device data 305 (shown in FIG. 3) and, more specifically, receiving present images 115 from a present image source. In the exemplary embodiment, the present image source is visual inspection device 110 (shown in FIG. 1). In alternative embodiments, the present image source may be memory device 130, storage device 135, or external storage 160.

Computer device 120 also identifies 420 at least one matching historic image corresponding to at least one present image. Identifying 420 at least one matching historic image corresponding to at least one present image represents using image retriever 315 (shown in FIG. 3). More specifically, identifying 420 at least one matching historic image corresponding to at least one present image represents selecting historic image data 140 (shown in FIG. 1) that corresponds to present images 115.

Computer device 120 further identifies 425 at least one matching engineering model corresponding to at least one present image. Identifying 425 at least one matching engineering model represents using image retriever 315 to receive a point cloud containing engineering model data 145 (shown in FIG. 1) associated with historic image data 140. As discussed above, the image retriever uses features determined for present image 115 and compares them to historic image data 140 to determine historic image data 140 which most corresponds to present image 115. The computer-implemented systems and methods as described herein provide an automated approach for inspecting physical assets with a visual inspection device. The embodiments described herein facilitate automated comparison of image data from a visual inspection device with engineering model data without requiring manual intervention or external input. Due to the automatic retrieval of historic image, the automatic matching between present and historic image features that achieves transferring of point cloud to the present image, the laborious process of manually picking feature matches between the model and the present image is avoided. Also, the methods and systems described herein facilitate rapid inspection and analysis of physical assets. Further, the methods and systems described herein will reduce the cost of inspection through reduced time and human resources used for inspection. Additionally, these methods and systems will enhance the uptime of physical assets by reducing a need to disassemble an asset for inspection. Furthermore, the methods and systems described herein will reduce the operational, logistical, and financial costs associated with the inspection of physical assets through efficient analysis and model comparisons.

An exemplary technical effect of the methods and computer-implemented systems described herein includes at least one of (a) increases rate of analysis of visual data from a visual inspection device on physical assets; (b) improved monitoring of physical assets through precise visual data comparisons; and (c) greater uptime of physical assets through a diminished need to disassemble the assets.

Exemplary embodiments for enhanced visual inspection of a physical asset are described above in detail. The computer-implemented systems and methods of operating such systems are not limited to the specific embodiments described herein, but rather, components of systems and/or steps of the methods may be utilized independently and separately from other components and/or steps described herein. For example, the methods may also be used in combination with other enterprise systems and methods, and are not limited to practice with only the visual inspection systems and methods as described herein. Rather, the exemplary embodiment can be implemented and utilized in connection with many other enterprise applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented system for enhanced automated visual inspection of a physical asset comprising:
   a visual inspection device that generates images of the physical asset; and
   a computing device including a processor, a memory device coupled to said processor, and a storage device coupled to said memory device and to said processor, wherein said storage device includes at least one historic image of the physical asset and at least one engineering model substantially representing the physical asset, said computing device configured to:
   receive, from a present image source, at least one present image of the physical asset captured by said visual inspection device;
   determine, from said at least one present image, a set of present salient features;
   determine, from said at least one historic image, a set of historic salient features;
   compare said set of present salient features and said set of historic salient features;
   identify from said at least one historic image using at least one image retrieval method employing said set of present salient features and said set of historic salient features, at least one matching historic image corresponding to said at least one present image;
   identify from said at least one engineering model, at least one matching engineering model corresponding to said at least one present image; and
   determine a pose of said visual inspection device with respect to the physical asset based upon said engineering model.

2. A computer-implemented system in accordance with claim 1, wherein said present image source is at least one of:
   said visual inspection device;
   said storage device;
   said memory device; and
   an external storage device.

3. A computer-implemented system in accordance with claim 1, further configured to use keypoint matching to identify the best sets of matching points between said at least one historic image and said at least one present image.

4. A computer-implemented system in accordance with claim 1, further configured to:
   determine two-dimensional pixel locations in said at least one matching historic image;
   determine, from said two-dimensional pixel locations, three-dimensional point locations in said matching engineering model;
   generate, from said three-dimensional point locations, a mathematical model of projections of said matching engineering model, said mathematical model representative of a function of characteristics of said visual inspection device, rotation of said visual inspection device, and translation of said visual inspection device; and determine, from said mathematical model of projections of said matching determine, from said mathematical model of projections of said matching engineering model and said at least one present image, a position of said visual inspection device with respect to the physical asset.

5. A computer-implemented system in accordance with claim 4, wherein said computer-implemented system configured to identify at least one matching engineering model corresponding to said at least one present image is further configured to:

create, using said position of said visual inspection device, a projection of said matching engineering model;

overlay said projection of said at least one present image on said matching engineering model; and measure differences between said projection and said at least one present image.

6. A computer-based method for enhanced automated visual inspection of a physical asset, wherein said method is performed by a computing device, said computing device including a processor, a memory device coupled to said processor, and a storage device coupled to said memory device and to said processor, wherein said storage device includes at least one historic image of the physical asset and at least one engineering model substantially representing the physical asset, said method comprising:

receiving, from a present image source, at least one present image of the physical asset captured by said visual inspection device, wherein said present image source is at least one of: said visual inspection device; said storage device; said memory device; and an external storage device;

determining, from said at least one present image, a set of present salient features;

determining, from said at least one historic image, a set of historic salient features;

comparing said set of present salient features and said set of historic salient features;

identifying from said at least one historic image using at least one image retrieval method employing said set of present salient features and said set of historic salient features, at least one matching historic image corresponding to said at least one present image;

identifying from said at least one engineering model, at least one matching engineering model corresponding to said at least one present image; and determining a pose of said visual inspection device with respect to the physical asset based upon said engineering model.

7. A computer-based method in accordance with claim 6, further comprising using keypoint matching to identify the best sets of matching points between said at least one historic image and said at least one present image.

8. A computer-based method in accordance with claim 6, further comprising:

determining two-dimensional pixel locations in said at least one matching historic image;

determining, from said two-dimensional pixel locations, three-dimensional point locations in said matching engineering model;

generating, from said three-dimensional point locations, a mathematical model of projections of said matching engineering model, said mathematical model representative of a function of characteristics of said visual inspection device, rotation of said visual inspection device, and translation of said visual inspection device; and determining, from said mathematical model of projections of said matching engineering model and said at least one present image, a position of said visual inspection device with respect to the physical asset.

9. A computer-based method in accordance with claim 8, wherein identifying at least one matching engineering model corresponding to said at least one present image further comprises:

creating, using said position of said visual inspection device, a projection of said engineering model;

overlaying said at least one present image on said engineering model; and measuring differences between said projection and said at least one present image.

10. A computer for enhanced automated visual inspection of a physical asset, said computer includes a processor, a memory device coupled to said processor, and a storage device coupled to said memory device and to said processor, wherein said storage device includes at least one historic image of the physical asset and at least one engineering model substantially representing the physical asset, said computer configured to:

receive, from a present image source, at least one present image of the physical asset captured by said visual inspection device;

determine, from said at least one present image, a set of present salient features;

determine, from said at least one historic image, a set of historic salient features;

compare said set of present salient features and said set of historic salient features;

identify from said at least one historic image using at least one image retrieval method employing said set of present salient features and said set of historic salient features, at least one matching historic image corresponding to said at least one present image;

identify from said at least one engineering model, at least one matching engineering model corresponding to said at least one present image; and determine a pose of said visual inspection device with respect to the physical asset based upon said engineering model.

11. The computer of claim 10, wherein said present image source is at least one of:

said visual inspection device;
said storage device;
said memory device; and
an external storage device.

12. The computer of claim 11, further configured to use keypoint matching to identify the best sets of matching points between said at least one historic image and said at least one present image.

13. The computer of claim 10, further configured to:

determine two-dimensional pixel locations in said at least one matching historic image;

determine, from said two-dimensional pixel locations, three-dimensional point locations in said matching engineering model;

generate, from said three-dimensional point locations, a mathematical model of projections of said matching engineering model, said mathematical model representative of a function of characteristics of said visual inspection device, rotation of said visual inspection device, and translation of said visual inspection device; and determine, from said mathematical model of projections of said matching engineering model and said at least one present image, a position of said visual inspection device with respect to the physical asset.

14. The computer of claim 13, wherein said computer configured to identify at least one matching engineering model corresponding to said at least one present image is further configured to:

create, using said position of said visual inspection device, a projection of said engineering model;

overlay said at least one present image on said engineering model; and measure differences between said projection and said at least one present image.

* * * * *